(12) United States Patent
Romer et al.

(10) Patent No.: US 6,854,291 B2
(45) Date of Patent: Feb. 15, 2005

(54) METHOD FOR NOZZLE-INJECTION OF GAS INTO MOLTEN GLASS

(75) Inventors: Hildegard Romer, Karben (DE); Nicole Surges, Bingen (DE); Paul Kissl, Mainz (DE); Thomas Kirsch, Mainz (DE)

(73) Assignee: Schott Glas, Mainz (DE)

( * ) Notice: Subject to any disclaimer, the term of this patent is extended or adjusted under 35 U.S.C. 154(b) by 250 days.

(21) Appl. No.: 09/945,385

(22) Filed: Aug. 31, 2001

(65) Prior Publication Data

US 2002/0035855 A1 Mar. 28, 2002

(30) Foreign Application Priority Data

Sep. 2, 2000 (DE) .......................................... 100 43 279

(51) Int. Cl.⁷ ................................................ C03B 5/16
(52) U.S. Cl. ..................................... 65/134.5; 65/134.1
(58) Field of Search .......................... 65/134.1, 134.4, 65/180, 134.5, 178, 134.9, 135.2, 135.3

(56) References Cited

U.S. PATENT DOCUMENTS 2,387,222 A * 10/1945 Wright ....................... 65/134.5
2,890,548 A *  6/1959 Wright ....................... 65/134.5

FOREIGN PATENT DOCUMENTS

| DE | 199 35 686 | 2/2001 |
| SU | 391066 | 12/1973 |
| SU | 566779 | 8/1977 |
| SU | 573453 | 10/1977 |
| SU | 975596 | 11/1982 |
| SU | 1357029 | 12/1987 |

* cited by examiner

*Primary Examiner*—Dionne A. Walls
(74) *Attorney, Agent, or Firm*—Merchant & Gould P.C.

(57) ABSTRACT

A method and device for nozzle-injection of gas into molten glass is disclosed wherein a gas stream is introduced into the molten glass in a temporally pulsed throughput such that the gas stream is interrupted between two sequential pulses, the duration of each pulse amounting to less than one second.

8 Claims, 3 Drawing Sheets

- A melt-down region
- B bubbling zone
- C bottom bubbling nozzles
- D feeding of bubbling gas via agitator or fixed pipe
- E to the moulding process
- F homogenization

METHOD FOR NOZZLE-INJECTION OF GAS INTO MOLTEN GLASS

The invention relates to the field of treatment of molten glass. In particular, it has to do with the nozzle-injection of gas.

Molten glasses contain in a high degree dissolved gases as well as residual bubbles from the melting-down process ($CO_2$, $N_2$, $H_2O$, $SO_2$). In order to attain a bubble-free product, the gases must be expelled. This process step is also called refining.

Usually, used for the refining are chemical substances that decompose upon an increase in temperature and release gases. These released gases have a sort of flushing effect for the molten mass, since they inflate small bubbles present, accelerate the rate of the latter's rising up, and, during the rising up, collect and flush out gases still dissolved in the molten mass. Aside from such chemical refining methods, one can also imagine a physical refining through direct injection of gases.

One method of refining molten glass consists in the introduction of certain gases in a so-called bubbling process. As the bubbling gas, coming primarily into consideration is oxygen in the form of $O_2$. This has proved to be especially suitable, since it can be reabsorbed by the molten mass after the refining phase. Here, the physical solubility for this type of gas increases with falling temperature. Displaying favorable behavior during dead-melting is also the chemical solubility through polyvalent ions such as arsenic trioxide or antimony trioxide, but also, for example, iron oxide.

The refining process through bubbling is based on the following fundamentals:

Oxygen, which is introduced into the molten mass in the form of bubble, possesses a partial pressure of greater than approximately one bar. This pressure results from the atmospheric pressure and the hydrostatic pressure of the molten mass acts upon the bubble. All other partial pressures of other gases are, in the bubble, approximately equal to zero at the beginning, since no foreign gases are present in the bubble. The partial pressures of the gases dissolved in the molten mass ($CO_2$, $N_2$, $SO_2$, as well as $H_2O$) are in each case greater than in the bubble.

In order to equalize this difference in pressure, the oxygen in the bubbles exchanges itself with the gases located in the molten mass. Thus, $O_2$ from the bubble diffuses from the bubble into the molten mass, while $CO_2$, $N_2$, $SO_2$, as well as $H_2O$ diffuse from the molten mass into the bubble. The molten mass becomes depleted of foreign gases. In addition, small bubbles from the melting-down process are collected by the bubbles or even reabsorbed by the gas-depleted molten mass in the dead-melting region.

Thus, in the bubbling process the molten mass is slightly richened in $O_2$, while at the same time it becomes significantly more depleted of all other gases.

The bubbling process can be applied both in melting tubs and in refining vessels. Reference is made to DE 199 35 686 A1, merely as an example. The prior art provides for the continuous introduction of gases through nozzles, the nozzle opening of which has a diameter of 1–5 mm. The bubbles have a diameter of approximately 10 cm and, due to the quick rising-up and the small surface area relative to the gas volume, are not suitable for effective gas exchange.

The larger is the total bubble surface in the molten mass, the quicker or more intensive is the occurrence off the gas diffusion out of the individual oxygen bubbles. The foreign gases $CO_2$, $N_2$, $SO_2$, and $H_2O$ can diffuse more quickly from the molten mass into the bubble. In particular in the case of melt-down tubs, the length of time plays a considerable role. With equal unit volume of the bubbling gas introduced, many small bubbles have a substantially larger surface area than one large bubble. The small bubbles rise more slowly on the surface of the molten mass, so that a relatively long span of time is available for the above- mentioned gas exchange. It is thus advantageous to design the bubbling process such that small bubbles with a diameter of, ideally, 1–10 mm emerge from the nozzle. To achieve this is not easy. A diminishing of the blast-nozzle opening is not successful. The bubbles should not be too small, because otherwise they will no longer rise up.

Processes for nozzle-injection of gas into molten glass are already known, in which processes the stream of gas is introduced into the molten mass in a temporally pulsed throughput. See SU 975596 A, SU 391066 A, SU 566779 A, SU 1357029 A, SU 573453 A. These processes have also not been completely satisfactory. The refining process here does not run in an optimal manner.

The invention is based on the task of specifying a method by means of which the bubbling process can be achieved in consideration of a more intensive and quicker removal of foreign gases from molten gas.

This task is accomplished through the features of the independent claims.

Accordingly, measures are taken to introduce bubbling gas into the hot molten mass in a discontinuous throughput. In this context, the term "discontinuous" means that the throughput completely breaks off. Care is to be taken to ensure that the pressure pulse decreases with a very steep temporal flank. Only thereby can it be ensured that the bubbles break off early, when they are still small in volume. The next pressure pulse on the nozzle can follow only after the bubble has left the area of the nozzle. Between two pressure pulses, therefore, a pressure-free phase absolutely must be present, during which phase no new bubble can form on the nozzle.

The inventor has recognized the following facts:

In the bubbling according to the invention, there occurs a sudden rise in pressure, and following that a sharp drop in pressure. This has the consequence of a small underpressure of the gas on its way between the pulsation apparatus—for example a two-way valve—and the outlet nozzle. This underpressure has the effect that the gas bubble, which just moved from the nozzle opening into the molten mass, for a short time is again somewhat sucked back. In this way there arises a sharp break-off edge. The bubble is thus cleanly severed at the nozzle-outlet edge. In the case of the bubbling pulsed according to the invention, the bubbles are cut into small and very small bubbles at the nozzle-outlet edge. By virtue of the smallness, the bubbles have a relatively large surface area relative to the bubble volumes. Thus, collectively they are suited to taking up relatively large amounts of foreign gases. This favorable behavior is strengthened through a low rate of rise of small bubbles in the molten mass and thus through their long dwell time.

The invention is explained in detail with the aid of the drawings. In the latter, the following are represented in particular:

Figure 1:
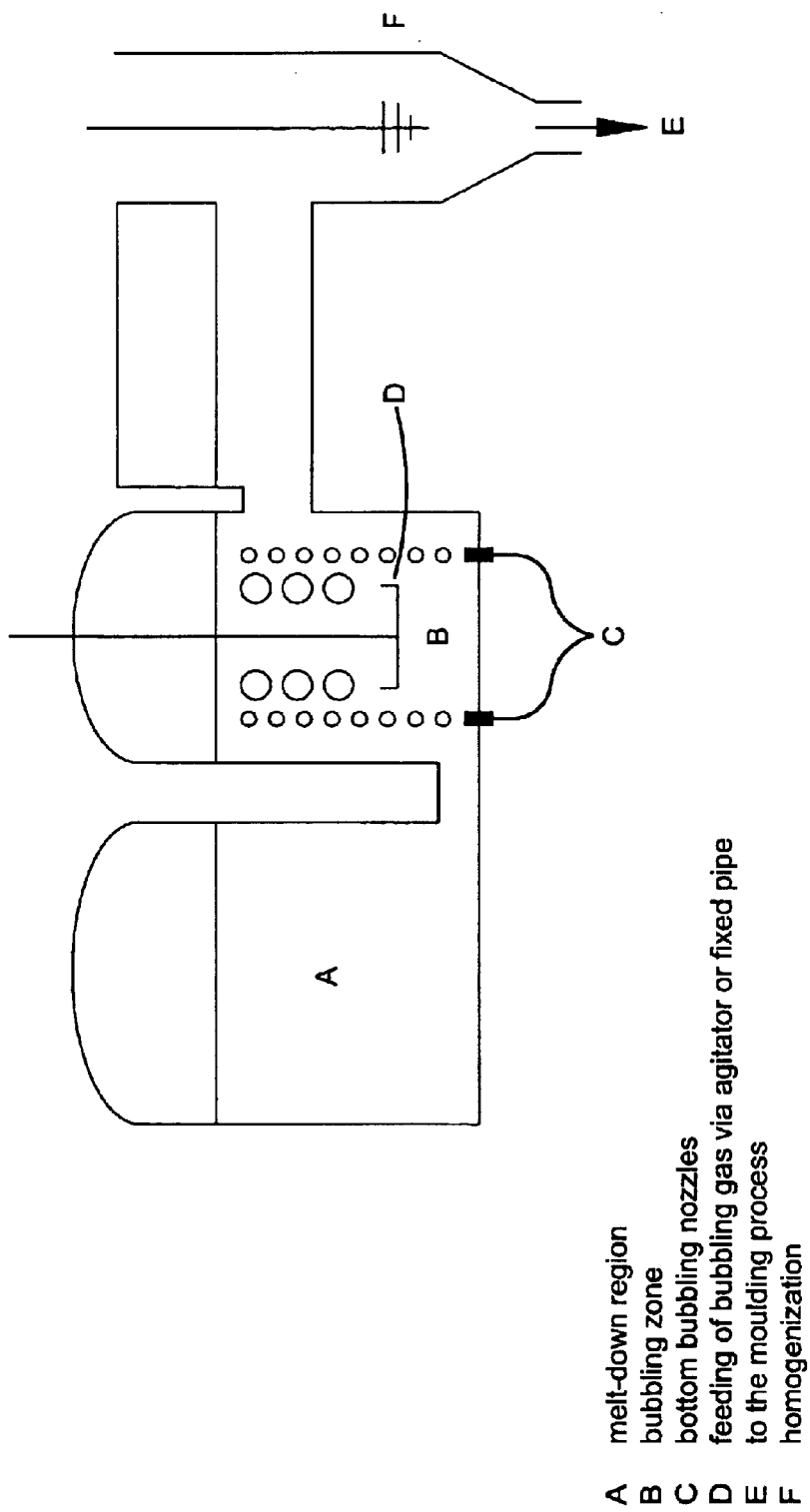
FIG. 1 shows an arrangement for melting down, refining, and conditioning glass, in a schematic representation.
Figure 2A:
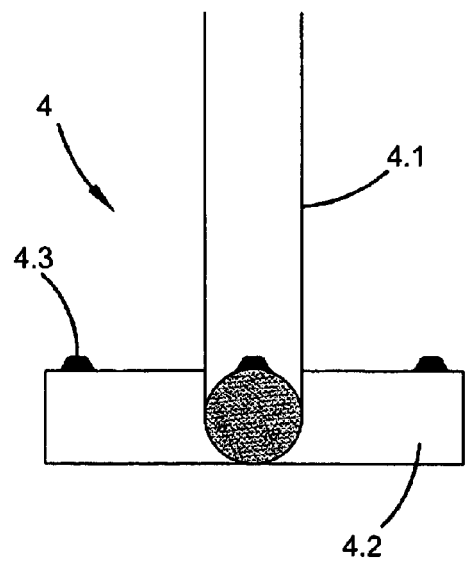
FIGS. 2a and 2b show an agitator according to the invention, by means of which the gases can be introduced.
Figure 2B:
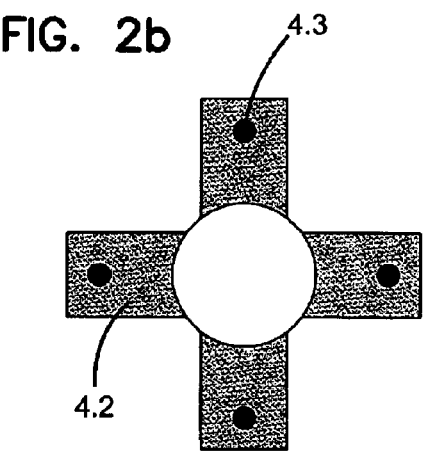

The arrangement shown in FIG. 1 comprises a meltdown tub A, a bubbling area B, a dead-melting region C, and a homogenization apparatus F.

In the melting crucible A, so-called mixtures or broken glass pieces or both are placed and melted down in a conventional manner. The molten mass is then transported to the bubbling area B via a channel 1, and from there to the agitation device D via a channel C. The bubbling area B serves the washing out of foreign gases through the introduction of $O_2$. The bubbling feed comprises an agitator 4. The agitator comprises an agitator shaft 4.1. At the other end of the agitator shaft are situated four vanes 4.2. The agitator shaft 4.1 is constructed as a duct, whose upper thread displays a connection for the supplying of $O_2$. The duct of the connection continues to the vanes 4.2, and from there to, in each case, a nozzle 4.3. The nozzles 4.3 are directed upwardly, so that the $O_2$ gas also rises upwardly into the molten mass. It is also possible to point the nozzles in a downward direction or towards the side. In such a device, the gas can also be introduced via bottom nozzles.

The agitator or bottom nozzles, as the case may be, consist of platinum.

Situated between the gas connection and the platinum nozzles is a two-way valve (not shown here), with an associated control arrangement. The control arrangement provides for the opening and closing of the valve. The open time, in the present case, amounts to 40 ms. The time span between two pressure pulses amounts to between 1 and 10 s. The time must be long relative to the pulse duration, and long enough that the first bubble can rise up. If this is not ensured, then the two bubbles will unify into one large bubble. The throughput of the $O_2$ gas can be regulated, likewise the interval time, and thus the frequency by which the valve is controlled.

The bubble size depends directly on the preliminary pressure of the gas. The higher the pressure, the larger the bubbles become. This is logical, since with the same opening time of the valve, a higher pressure causes a greater amount of gas to flow through the system than is the case with a lower pressure.

Investigations have shown that through an intensive bubbling a substantially higher refining quality is achieved, in comparison to a bubbling in the conventional manner.

Figure 3:
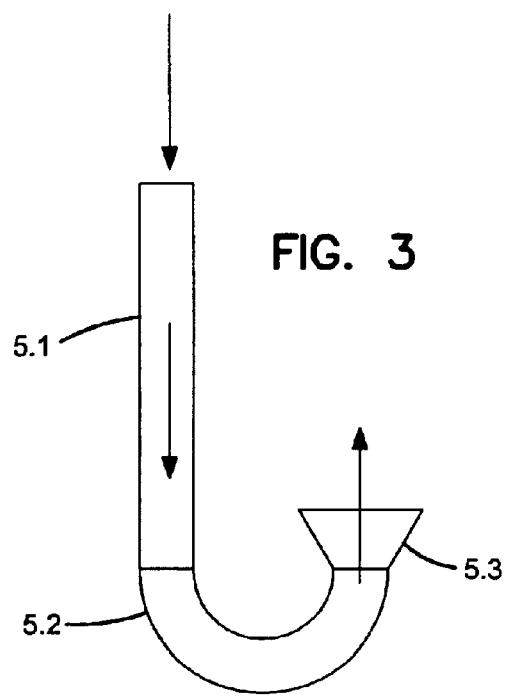
FIG. 3 shows a feed pipe for introducing $O_2$ into the molten mass.

The feed pipe 5 shown in FIG. 3 serves, for its part, the supplying of $O_2$ gas or another suitable refining gas. The feed pipe 5 has the design of an inverted cane. The connection for the feeding of the gas is again situated above, and the outlet below. The feed pipe is constructed from a straight-line section 5.1, a curved piece 5.2, and a nozzle body 5.3. The nozzle body 5.3 displays a central bore with an inside width of 0.1 mm. The gas thus emerges in an upward direction.

Associated with the feed pipe 5 is, in turn, a pulsation device, which is not represented here. This provides for a pulsing release of the gas from the nozzle body 5.3. The feed pipe, for its part, consists of platinum, especially the nozzle body.

Feed pipes of the described type can be associated with both the melting crucible A and with the refining crucible B.

FIGS. 4–7 are diagrams on which are represented the throughput of $O_2$ gas over time.

Figure 4:
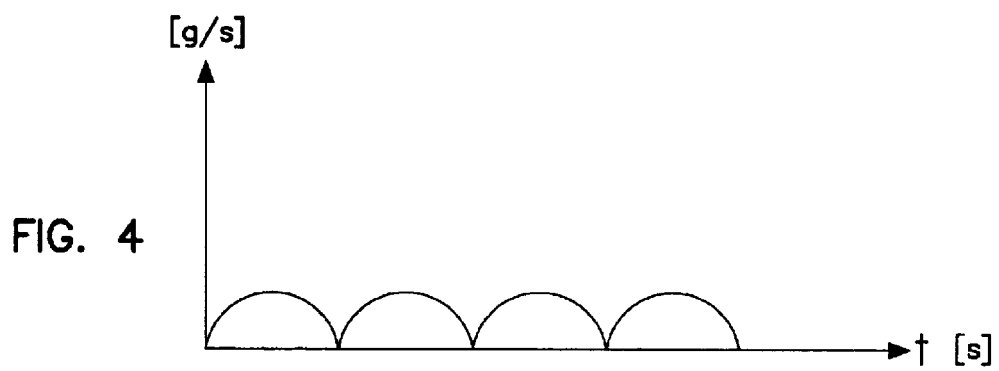
FIGS. 4–7 show diagrams that illustrate the pulsation course.
Figure 5:
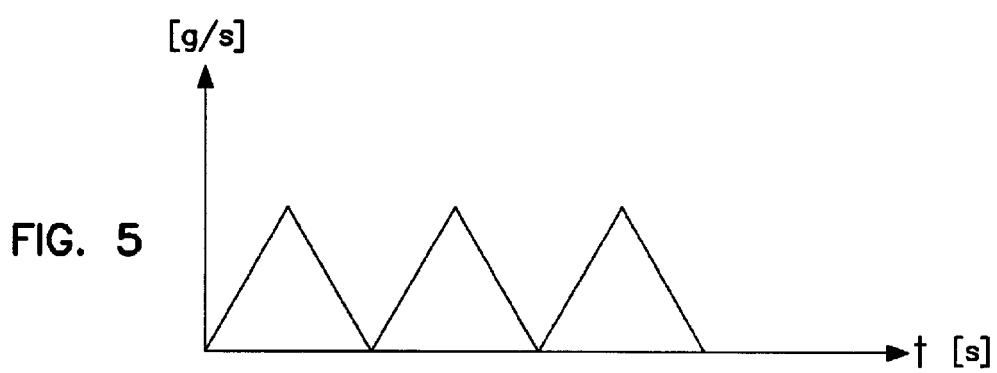
Figure 6:
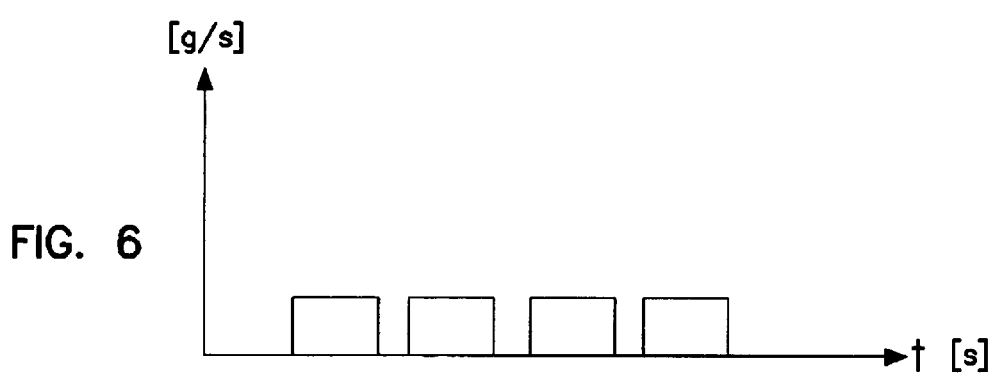
Figure 7:
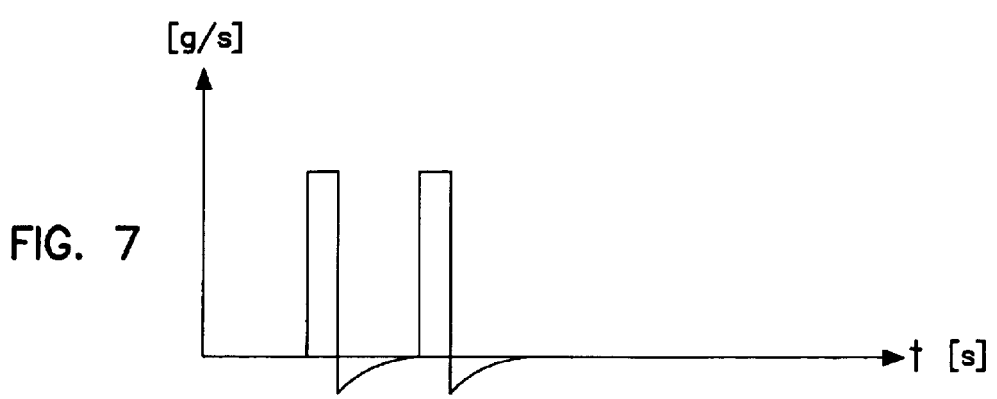

As one can see, in FIGS. 4–6 the pulsation shows a strongly staccato character. In FIG. 7, the individual pulses have a suddenly and strongly rising, and equally suddenly and strongly falling course, so that the result is a more or less slender rectangle.

Very generally, steep pressure flanks are required in order to ensure a breaking-off of the bubbles.

Especially important is a steep pulse flank at the end of each pulse. The falloff from maximum value to null should take place as instantaneously as possible. It should take no longer than 200 ms, preferably less than 100 ms. Still smaller values have proved to be especially favorable, for example, 80, 50, 40, 30 ms or less.

The pulse duration also plays a definite role. It should be short, in any case shorter than 200 ms, still better, shorter than 100 ms. Values of 20 to 40 ms have proved to be optimal.

The case appears to be different with the interval times, that is, the time span between two sequential pulses. These times should be relatively long. They should lie in the range of second, amounting to, for example, one second, two seconds, 10 seconds, or even 20 seconds. The reason for this is the fact that after the generation of bubbles of minimal size, a certain time should elapse in order to give the generated bubbles time to rise up before the next surge of bubbles follows. That is to say, if the time span between two sequential pulses is too short, then this could lead the penetration by bubbles produced during one pulse into the bubbles produced during the preceding pulse and joining with the latter to form larger bubbles, which is undesirable.

Thus, according to the teaching of the invention the following are recommended, in brief summary:

short pulse duration sudden falloff at the end of the pulse duration long interval times between sequential pulses

What is claimed is:

1. Method for nozzle-injection of gas into molten glass, comprising:

1.1 introducing a gas stream into a molten mass in a temporally pulsed, throughput;

1.2 interrupting the gas stream between two sequential pulses by creating a pressure-free phase;

1.3 wherein duration of the pulses amounts to less than 1 s and wherein following the pulse the pressure falls from a maximum value to null within a time span of less than 100 ms.

2. Method according to claim 1, wherein the duration of the pulses amounts to less than 100 ms.

3. Method according to claim 1, wherein the duration of the pulses amounts to less than 50 ms.

4. Method according to claim 1, wherein following the pulse the pressure falls from a maximum value to null within a time span of less than 50 ms.

5. Method according to claim 1, wherein a temporal interval between two sequential pulses amounts to at least 1 s.

6. Method according to claim 1, wherein a temporal interval between two sequential pulses amounts to at least 10 s.

7. Method according to claim 1, further comprising the step of:

8.1 depleting the molten mass of foreign gases through flushing with $O_2$ gas;

8.2 wherein pulsing of the gas stream produces bubbles having a high surface-area/volume ratio through impressed pressure profiles, in order to minimize the bubble volume and to maximize the expelling of foreign gas.

8. Method according to claim 1, wherein following the pulse the fall in pressure causes an underpressure of the gas stream which creates a backsucking effect.

* * * * *